United States Patent

Sasa et al.

[11] Patent Number: 4,904,002
[45] Date of Patent: Feb. 27, 1990

[54] FLUID COUPLING

[75] Inventors: Takeya Sasa; Yoshikazu Kobayashi; Reichi Makishima, all of Tokyo, Japan

[73] Assignee: Nitto Kohki Co., Ltd., Tokyo, Japan

[21] Appl. No.: 268,703

[22] Filed: Nov. 8, 1988

[30] Foreign Application Priority Data

Nov. 10, 1987 [JP] Japan ................ 62-171800

[51] Int. Cl.⁴ .......................................... F16L 37/22
[52] U.S. Cl. .................................. 285/316; 285/318; 285/362; 285/903
[58] Field of Search ............ 285/362, 395, 903, 318, 285/91, 82, 314, 315, 316, 361; 403/104, 369, 366

[56] References Cited

U.S. PATENT DOCUMENTS

| 1,710,416 | 4/1929 | Goeller ..................... 403/369 X |
| 1,738,216 | 12/1929 | Wallace . |
| 2,503,169 | 4/1950 | Phillips . |
| 2,731,058 | 1/1956 | Smisko . |
| 2,961,630 | 11/1960 | Duncan . |
| 3,425,026 | 1/1969 | Theunissen ................ 285/362 X |
| 3,635,501 | 1/1972 | Thorne-Thomsen . |
| 3,649,052 | 3/1972 | Snyder, Jr. . |
| 3,871,691 | 3/1975 | Takagi et al. . |
| 3,934,902 | 1/1976 | McNamee . |
| 4,014,467 | 3/1977 | Ferguson . |
| 4,437,691 | 3/1984 | Laney . |
| 4,630,850 | 12/1986 | Saka ........................... 285/322 |
| 4,674,775 | 6/1987 | Tajima ........................ 285/322 |

FOREIGN PATENT DOCUMENTS

| 0009853 | 1/1907 | Denmark . |
| 0222051 | 5/1987 | European Pat. Off. ............ 285/331 |
| 2110550 | 9/1972 | Fed. Rep. of Germany ...... 285/316 |
| 2624521 | 12/1976 | Fed. Rep. of Germany ...... 285/361 |
| 1101782 | 10/1955 | France . |
| 1146672 | 11/1957 | France ............................. 285/361 |
| 9-13915 | of 0000 | Japan . |
| 49-31783 | 8/1974 | Japan . |
| 55-50460 | 11/1980 | Japan . |
| 58-94988 | 6/1983 | Japan . |
| 62-32290 | 2/1987 | Japan . |
| 62-51916 | 3/1987 | Japan . |
| 0004240 | of 1911 | United Kingdom . |
| 1371609 | 10/1974 | United Kingdom ................ 285/903 |

Primary Examiner—Randolph A. Reese
Assistant Examiner—Anthony Knight
Attorney, Agent, or Firm—Nixon & Vanderhye

[57] ABSTRACT

A fluid coupling for a corrugated pipe, comprising a coupling body having an axial through hole and a cylindrical outer peripheral surface, metallic seal means arranged at a pipe insertion portion of the axial through hole, for sealing an end portion of a corrugated pipe, a first sleeve having a first end portion, slidably mounted on the outer peripheral surface of the coupling body and urged axially outward, ring-shaped engaging members adjoining the first end portion of the sleeve and reducible in diameter, and retaining means surrounding the sleeve and the engaging members so as to be movable relative to the coupling body and the sleeve, the retaining means being adapted to reduce the diameter of the engaging members so that the engaging members are forced into root portions of the corrugated pipe, whereby the engaging members are held in a predetermined axial position.

11 Claims, 2 Drawing Sheets

FLUID COUPLING

BACKGROUND OF THE INVENTION

1. Field of the Invention

The present invention relates to fluid couplings or fittings for connecting bellows-shaped metallic corrugated pipes.

2. Description of the Related Art

In recent years, metallic corrugated pipes have come to be used more and more as replacements for conventional steel pipes used as indoor gas piping in houses and the like, since they are flexible and thus more workable However, since corrugated pipes have a bellows-shaped outline with top and root portions arranged alternately they are less easy to connect to each other or to other pipes than are conventional steel pipes. For this reason, fluid couplings used with corrugated pipes tend to have connecting mechanisms which are complicated and therefore difficult and time-consuming to operate As a result, there is considerable demand for the development of a fluid coupling which will permit corrugated pipes to be more easily connected to each other and to other types of pipe.

Moreover, there is demand for the elimination of the rubber gaskets which are conventionally used to seal most corrugated pipes in order to prevent gas leakage, since in the event of a fire breaking out, the rubber gaskets will most likely be melted by the heat produced, thereby causing gas to leak out and further feed the fire.

SUMMARY OF THE INVENTION

The object of the present invention is to provide a fluid coupling free of the aforementioned problems, and enjoying high working efficiency, simple construction, and low manufacturing costs.

In order to achieve the above object, according to the present invention, there is provided a fluid coupling for a corrugated pipe, which comprises: a coupling body including a first end portion, a second end portion, an axial through hole, and a cylindrical outer peripheral surface adjacent to the first end portion, the through hole having a pipe insertion portion, disposed close to the first end portion and adapted to receive an end portion of a corrugated pipe, and a fluid passage disposed close to the second end portion; metallic seal means arranged at the pipe insertion portion, for sealing an end portion of a corrugated pipe pressed against the same; a first sleeve having first and second end portions and slidably mounted on the outer peripheral surface of the coupling body, on the first end portion side thereof, the first end portion of the sleeve projecting axially outward from the first end portion of the coupling body and being urged axially outward; ring-shaped engaging members adjoining the first end portion of the sleeve and having their inside diameter reducible to a size smaller than the outside diameter of the top of corrugation of the corrugated pipe; and retaining means surrounding the sleeve and the ring-shaped engaging members so as to be movable relative to the coupling body and the sleeve, the retaining means being adapted to move toward the second end portion of the coupling body, thereby reducing the diameter of the ring-shaped members so that the ring-shaped members are forced into a root portion of the corrugated pipe inserted in part of the pipe insertion portion, whereby the ring-shaped members are held in a predetermined axial position such that the end portion of the corrugated pipe is pressed against the seal means.

Preferably, the whole fluid coupling is made of metal.

In connecting the corrugated pipe to the fluid coupling, the corrugated pipe is inserted into the first end portion at the front end of the coupling body, and the retaining means is moved to the second end portion at the rear end side. Thereupon, the ring-shaped members, adjoining the first end portion, are centripetally pushed to be radially contracted. Thus, the engaging members are engagedly pressed against the outer peripheral root portion of the inserted corrugated pipe, thereby preventing the pipe from slipping out of the coupling body. As the retaining member moves in the aforesaid direction, moreover, the first sleeve retreats against the urging force of a spring, so that the engaging members also move in the same direction. As the ring-shaped engaging members move in this manner, the corrugated pipe, whose outer peripheral surface is engagedly pressed by the engaging members, is moved in the same direction. As a result, the front end of the corrugated pipe is pressed against the seal means inside the coupling body, to be sealed thereby.

Thus, by inserting the corrugated pipe into the coupling body so that the retaining means is moved toward the rear end side, the pipe can be connectedly fixed to the coupling body in a manner such that the ring-shaped engaging members are radially contracted to be pressed against the outer peripheral root portion of the inserted pipe. Also, the front end portion of the corrugated pipe can be sealed by means of the seal means disposed inside the coupling body. Thus, the connection work is easy.

The whole fluid coupling may be made of metal, and the fluid coupling may be used to connect a metallic corrugated pipe for gas supply whose front end portion is metal-sealed. In case of a fire, according to such an arrangement, the metal seal means can prevent or minimize gas leakage from the corrugated pipe. Accordingly, an accident due to a gas leak can be prevented. Thus, the fluid coupling according to the present invention can be very conveniently used for the connection of a corrugated pipe, especially one for use as an indoor gas pipe. Since the fluid coupling has a simple construction, moreover, it can be easily manufactured at low cost.

DETAILED DESCRIPTION OF THE PREFERRED EMBODIMENTS

Figure 1:
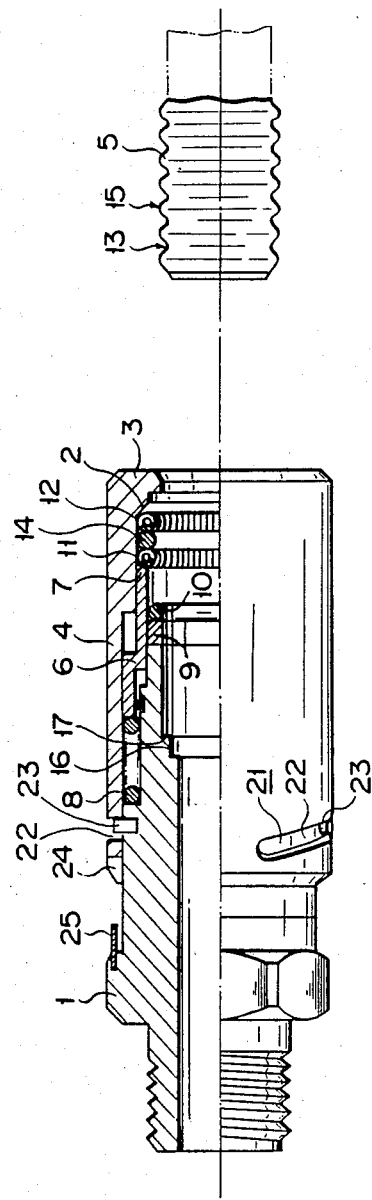
FIG. 1 is a partial longitudinal sectional view of a fluid coupling according to an embodiment of the present invention.

Although preferred embodiments of the present invention will now be described in detail with reference to the accompanying drawings, it is to be understood that the invention is not limited to those precise embodiments.

In these drawings, numeral 1 designates a cylindrical coupling body which, preferably made of metal, constitutes a fluid coupling. Body 1 has an axial through hole which includes a pipe insertion hole and a fluid passage. Sleeve 4, which has taper surface 2 and wall or collar portion 3, is movably fitted on body 1. Taper surface 2, which is formed on the inner peripheral surface of the front end portion (right-hand portion in FIG. 1) of body 1, is converging toward the front end side. Collar portion 3 protrudes continuously inward from surface 2. Sleeve 4 serves as retaining means which reduces the diameter of engaging members (mentioned later) and holds them in a predetermined axial position. A male thread, which is formed at the opposite end portion (left-hand portion in FIG. 1) of body 1, can threadedly engage an ordinary pipe, such as a gas pipe. The inside diameter of collar portion 3 is large enough to allow the passage of bellows-shaped metallic corrugated pipe 5 for, e.g., gas supply, which is inserted in and connected to body 1. Numeral 6 designates a first sleeve which is slidably fitted between the outer peripheral surface of the front end portion of cylindrical body 1 and second sleeve 4. The front end of first sleeve or intermediate cylinder 6 comprises taper surface 7 which is slanted oppositely to taper surface 2 of sleeve 4, and faces surface 2. Numeral 8 designates a spring which is interposed between body 1 and first sleeve 6. Spring 8 urges sleeve 6 so that the front end of sleeve 6 projects from the front end of cylindrical body 1. Numeral 9 designates a gasket formed of an elastic material such as rubber. Numeral 10 denotes a ring which is fitted in first sleeve 6 so as to engage gasket 9. Numerals 11 and 12 denote ring-shaped members or engaging bodies which are held between taper surfaces 2 and 7 of second and first sleeves 4 and 6, inside sleeve 4. Engaging bodies 11 and 12 can expand and contract in the radial direction. When they contract, bodies 11 engage root portion 13 of corrugated pipe which is inserted in cylindrical body 1. Engaging bodies 11 and 12 are not particularly restricted in configuration, provided they can radially expand and contract as aforesaid. For example, they may be C-rings, garter springs, or circular springs in which both ends of a spring wire are juxtaposed to each other for relative movement in circumferencial direction, formed of a heat-resistant material, such as metal. In this embodiment, however, metallic circular springs are used as engaging bodies 11 and 12. The inside diameter of each of ring-shaped engaging bodies 11 and 12, situated inside sleeve 4, is kept large enough to allow the passage of corrugated pipe 5 therein. As sleeve 4 is moved toward the rear end side, bodies 11 and 12, held between taper surfaces 2 and 7, are centripetally pressed to be radially contracted. The contracted engaging bodies are engagedly pressed against root portion 13 around corrugated pipe 5 in cylindrical body 1. Numeral 14 designates a spacer ring sandwiched between engaging bodies 11 and 12.

If corrugated pipe 5 is inserted into the pipe insertion hole of cylindrical body 1 to move sleeve 4 rearward, engaging bodies 11 and 12, held between taper surfaces 2 and 7, are centripetally pressed to be radially contracted. The contracted engaging bodies are engagedly pressed against root portion 13 around corrugated pipe 5 in cylindrical body 1, and are also subjected to opposite forces. Thus, top portion 15 of corrugated pipe 5 situated between engaging bodies 11 and 12 is pressed from both sides, so that pipe 5 is prevented from slipping out of body 1. The movement of second sleeve 4 causes first sleeve 6 to retreat against the urging force of spring 8 with engaging bodies 11 and 12 kept contracted. As a result, bodies 11 and 12 are moved in the same direction while pressing corrugated pipe 5. Ring 10 is pressed by moving engaging body 11, so that rubber gasket 9 centripetally bulges to be pressed against the outer peripheral surface of pipe 5.

Numeral 16 designates a metal seal portion which is disposed inside cylindrical body 1. Seal portion 16 is pressed, for sealing, against the front end portion of corrugated pipe 5 which, having its outer peripheral surface pressed by engaging bodies 11 and 12 contracted by the movement of sleeve 4, advances in the same direction as bodies 11 and 12. The sealing of the front end portion of pipe 5 is not limited to this method, and any of the end face and the outer and inner surfaces of the front end portion of pipe 5 may be sealed.

Figure 2:
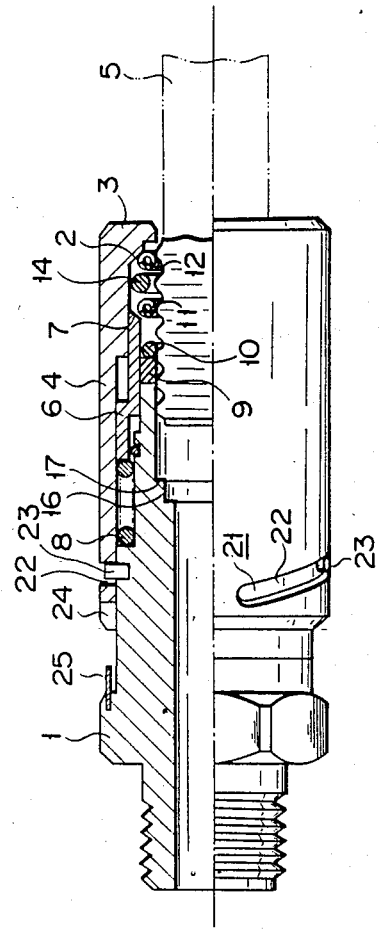
FIG. 2 is a partial longitudinal sectional view showing a process in which a corrugated pipe is inserted and connectedly fixed to the fluid coupling shown in FIG. 1.
Figure 3:
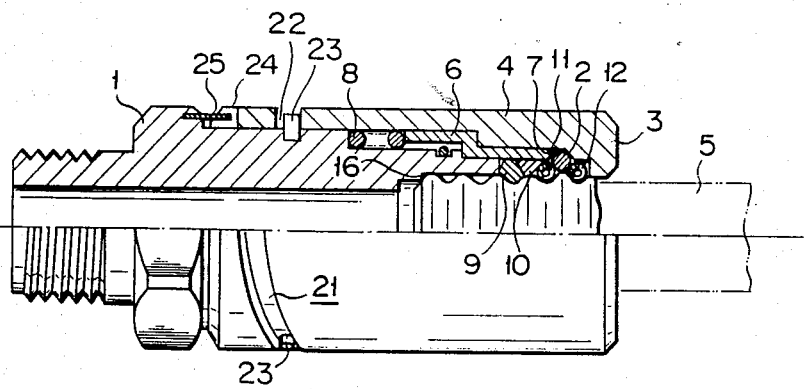
FIG. 3 is a partial longitudinal sectional view showing a state in which the corrugated pipe is connectedly fixed to the fluid coupling shown in FIG. 1 and sealed.

In the embodiment shown in FIGS. 1 to 3, the end face of the front end portion of corrugated pipe 5 is sealed. Metal seal portion 16 is formed of annular surface or small-diameter step portion 17 on the inner peripheral surface of cylindrical body 1. The end face of the front end portion of advanced pipe 5 is pressed against seal portion 16 or step portion 17 to effect sealing.

Figure 4:
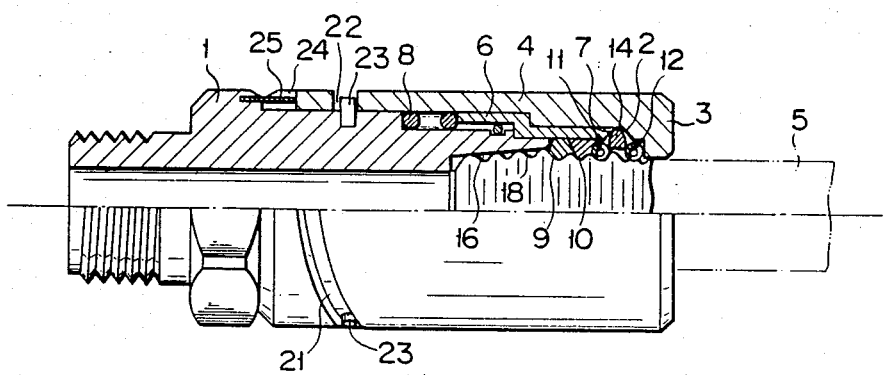
FIGS. 4 and 5 are partial longitudinal sectional views showing alternative embodiments.

In an embodiment shown in FIG. 4, the outer surface of the front end portion of corrugated pipe 5 is sealed. Metal seal portion 16 includes taper surface 18 which is formed on the inner peripheral surface of cylindrical body 1 so as to be gradually reduced in diameter toward the rear end. The front end portion of advanced pipe 5 is inserted into seal portion 16 or taper surface 18 so that its outer surface is pressed against surface 18 to effect sealing.

Figure 5:
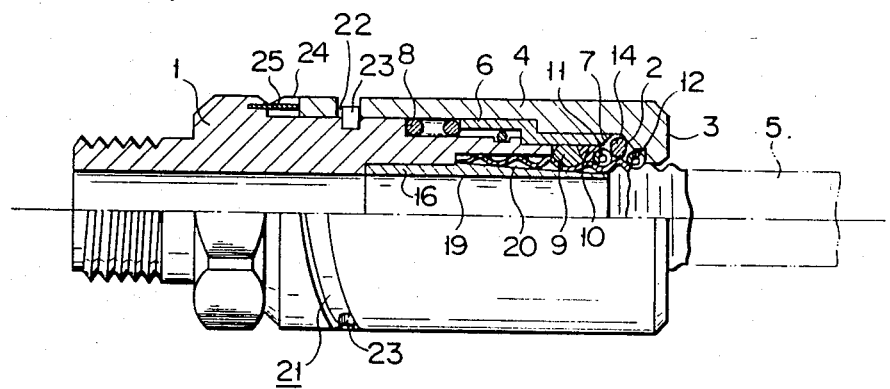

In an embodiment shown in FIG. 5, the inner surface of the front end portion of corrugated pipe 5 is sealed. Metal seal portion 16 is formed of cylindrical seal member 19 inserted in cylindrical body 1. Seal member 19 is adapted to be fitted in inserted corrugated pipe 5. The outer peripheral surface of the fitting portion of member 19 is formed of taper surface 20 which is reduced in diameter toward the front end. Seal member 19 is fitted into advanced pipe 5 so that the inner surface of the front end portion of pipe 5 is pressed against gradually spreading taper surface 20 of member 19 to effect sealing.

The fluid coupling according to the above embodiment is provided with fixing mechanism 21 for fixing sleeve 4 which is moved to the rear end side in order to connectedly fix and seal corrugated pipe 5. In this embodiment, mechanism 21 includes spiral guide groove 22 on sleeve 4, engaging pin 23 on the outer peripheral surface of cylindrical body 1 adapted to engage groove 22, engaging portion 24 at the rear end of sleeve 4, and stopper 25 on body 1. Engaging pin 23 causes sleeve 4 to move in the axial direction while rotating on cylindrical body 1. Engaging portion 24, which has an engaging surface on its leading side of rotation, rotates as sleeve 4 moves to the front end side. Stopper 25 is adapted to engage portion 24 when sleeve 4 is retreated to its full-back position, that is, when the connection or fixing and sealing of corrugated pipe 5 is finished. Before engaging the engaging portion, stopper 25, which is formed of a resilient material, runs on the rear end portion of sleeve 4 moved to the rear end side by rotation. After the engagement, sleeve 4 is prevented from rotating to move to the front end side, and is securely fixed in position. In this embodiment, guide groove 22 and engaging pin 23 are formed on sleeve 4 and the outer peripheral surface of cylindrical body 1, respectively. Alternatively, however, a guide groove and an engaging pin may be provided on the outer peripheral surface of body 1 and sleeve 4, respectively.

What is claimed is:

1. A fluid coupling for a corrugated pipe, comprising:
    a coupling body including a front end portion, a rear end portion, an axial through hole, and a cylindrical outer peripheral surface adjacent to the front end portion, said through hole having a pipe insertion opening at the front end portion, adapted to receive an end portion of the corrugated pipe therein, and a fluid passage disposed at the rear end portion;
    a metallic seal means arranged in said coupling body inward of said pipe insertion opening, for sealing an end of a corrugated pipe;
    an internal sleeve having a front end portion and a rear end portion, and slidably mounted on the outer peripheral surface of the front end portion of said coupling body, said front end portion having a first tapered surface which converges toward the rear end portion, projecting axially outward from the front end portion of said coupling body;
    ring-shaped engaging members adjoining said first tapered surface of said internal sleeve, and having inside diameters reducible to less than an outside diameter of top portions of the corrugated pipe;
    a retaining means for retaining said engaging members at a predetermined position in the axial direction wherein the end portion of the corrugated pipe is pressed against said metallic seal means;
    wherein said retaining means further comprises an external sleeve overlapped and slidably engaged with respect to said internal sleeve, said external sleeve having a corrugated pipe insertion opening in its center, and an annular projecting portion at one end thereof in opposing relationship to said first tapered surface of said internal sleeve, and said annular projection portion having a second tapered surface converging toward said front end portion, said engaging members being disposed between said first and second tapered surfaces so that said first and second tapered surfaces cooperate to press said ring-shaped engaging means radially inwardly into a root portion of the corrugated pipe inserted into said pipe insertion opening when said external sleeve is moved toward the rear end portion of said body.

2. The fluid coupling according to claim 1, wherein the second tapered surface of said annular projecting portion is tapered in the opposite direction with respect to the first tapered surface of said inner sleeve.

3. The fluid coupling according to claim 2, wherein said engaging members are provided in a pair and are pressed individually against two adjacent root portions of the corrugated pipe, and further comprising a spacer ring disposed between the paired engaging members, to separate the same by a predetermined axial distance.

4. The fluid coupling according to claim 3, further comprising a spring having one end abutted on the coupling body and the other end abutted on the second end portion of the first sleeve, said spring being adapted to urge the first sleeve toward the first end portion.

5. The fluid coupling according to claim 4, wherein said coupling body, seal means, first and second sleeves, engaging members, spacer ring, and spring are made of metal.

6. The fluid coupling according to claim 5, further comprising a fixing mechanism for holding the second sleeve in a predetermined axial position, in a manner such that the end portion of the corrugated pipe is pressed against the seal means and the engaging members are pressed against the root portions of the corrugated pipe.

7. The fluid coupling according to claim 6, wherein said fixing mechanism includes a guide groove formed on the second sleeve, on the second end portion side thereof, a recessed portion formed in the second end portion, a pin fixed to the outer peripheral surface of the coupling body and adapted to be guided by the guide groove, and stopper means fixed to the outer peripheral surface of the coupling body and adapted to engage the recessed portion, to prevent the second sleeve from rotating.

8. The fluid coupling according to claim 7, wherein said stopper means is formed of a resilient sheet body.

9. The fluid coupling according to claim 8, wherein said seal means includes an annular surface adapted to be pressed and sealed by at least one of the end faces of the corrugated pipe and the side surface of that top portion of the pipe adjacent to the end face, between the pipe insertion portion and the fluid passage.

10. The fluid coupling according to claim 8, wherein said seal means includes a taper surface adapted to be pressed and sealed by the outer peripheral surface of the top portion of the corrugated pipe, on the fluid passage side of the pipe insertion portion.

11. The fluid coupling according to claim 8, wherein said seal means includes a cylindrical seal member inserted in the pipe insertion portion and having one end inserted into the corrugated pipe in the pipe insertion hole, said one end portion of the seal member having an outer peripheral surface formed with a tapered surface converging toward said one end.

* * * * *

UNITED STATES PATENT AND TRADEMARK OFFICE
CERTIFICATE OF CORRECTION

PATENT NO. : 4,904,002

DATED : February 27, 1990

INVENTOR(S) : SASA et al.

It is certified that error appears in the above-identified patent and that said Letters Patent is hereby corrected as shown below:

On the title page:
Under foreign application priority data on the cover sheet of the patent, the Japanese patent application 62-171800 should read "62-171800(U)".

Signed and Sealed this

Ninth Day of April, 1991

Attest:

HARRY F. MANBECK, JR.

Attesting Officer

Commissioner of Patents and Trademarks